United States Patent
Maufer

(10) Patent No.: US 6,438,695 B1
(45) Date of Patent: Aug. 20, 2002

(54) SECURE WIRETAP SUPPORT FOR INTERNET PROTOCOL SECURITY

(75) Inventor: Thomas A. Maufer, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/183,449

(22) Filed: Oct. 30, 1998

(51) Int. Cl.[7] .............................. G06F 12/14; G06F 9/00
(52) U.S. Cl. .......................... 713/201; 380/23; 380/24; 379/35; 379/59
(58) Field of Search ................................. 713/200, 201, 713/202; 379/33, 35, 59; 380/21, 24, 23

(56) References Cited

U.S. PATENT DOCUMENTS

| | | | | |
|---|---|---|---|---|
| 5,390,169 A | * | 2/1995 | Bernstein | 370/55 |
| 5,392,277 A | * | 2/1995 | Bernstein | 370/55 |
| 5,428,667 A | * | 6/1995 | Easterling et al. | 379/59 |
| 5,590,171 A | * | 12/1996 | Howe et al. | 379/33 |
| 5,633,928 A | * | 5/1997 | Lestra et al. | 380/21 |
| 5,745,573 A | * | 4/1998 | Lipner et al. | 380/21 |
| 5,920,611 A | * | 7/1999 | Howell | 379/35 |
| 5,943,393 A | * | 8/1999 | Howell | 379/35 |

* cited by examiner

Primary Examiner—Norman M. Wright
(74) Attorney, Agent, or Firm—Wagner Murabito & Hao LLP

(57) ABSTRACT

Secure wiretap support for Internet Protocol security. Specifically, one embodiment of the present invention includes a system for allowing controlled access to a networked communication. The system comprises an intermediate device that includes memory. The memory of the intermediate device is for storing a policy rule therein. The intermediate device is adapted to download the policy rules governing access to a desired location. The system further comprises a client which is coupled to the intermediate device. The client is adapted to receive the policy rule when the intermediate device downloads it to the client. As such, any communication data intended to travel between a first destination and the client is forwarded to a second destination. Therefore, the present invention provides a method and system for providing law enforcement agencies the ability to wiretap specific encrypted communications. Moreover, the present invention provides this ability while allowing the established hardware infrastructure of computer networks to remain essentially unchanged. Furthermore, the present invention does not affect the performance of the network while enabling end users to utilize any encryption algorithms for their communications. Additionally, the present invention enables encrypted communication data to remain encrypted during transmittal en route to its destination.

40 Claims, 7 Drawing Sheets

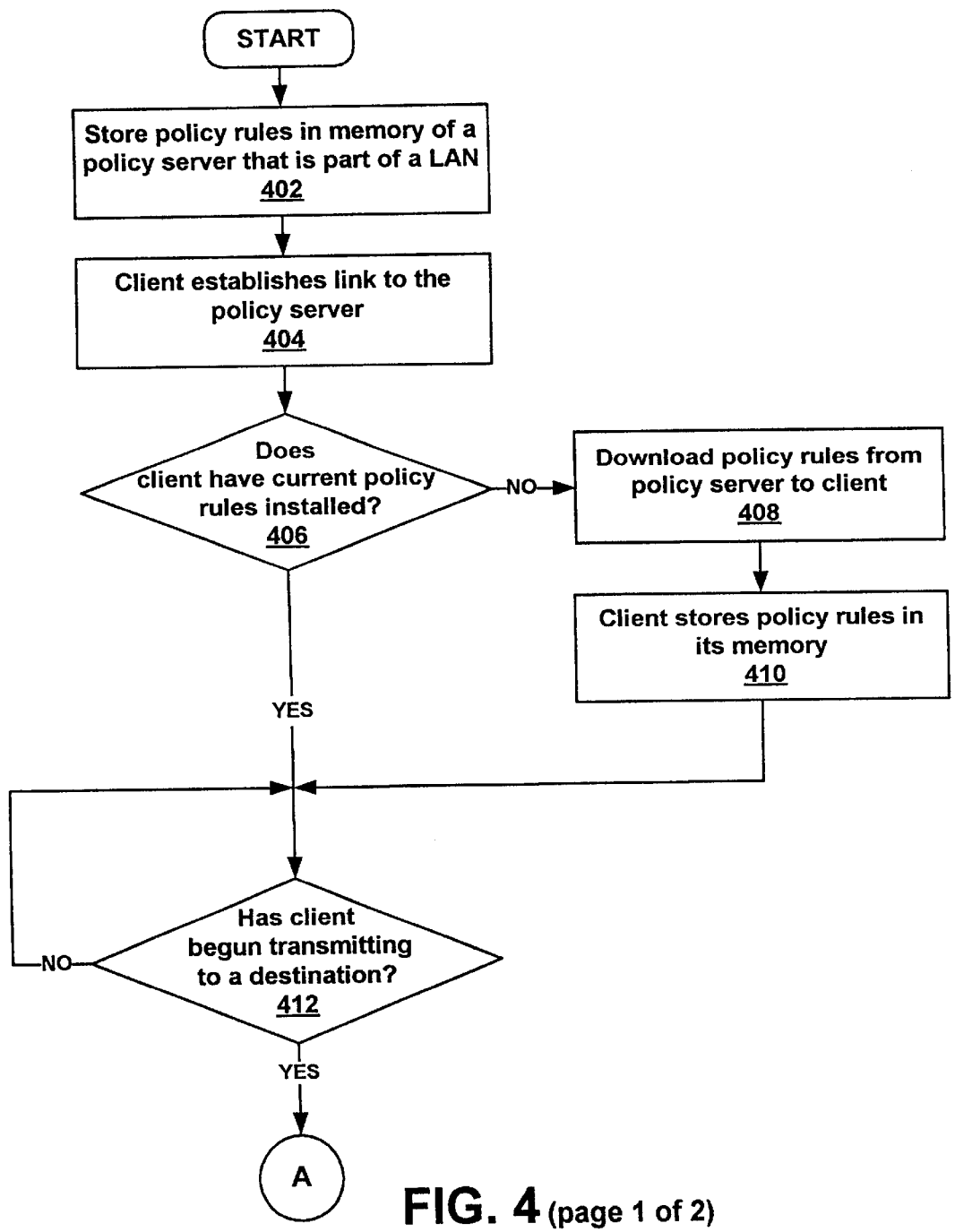
FIG. 4 (page 1 of 2)

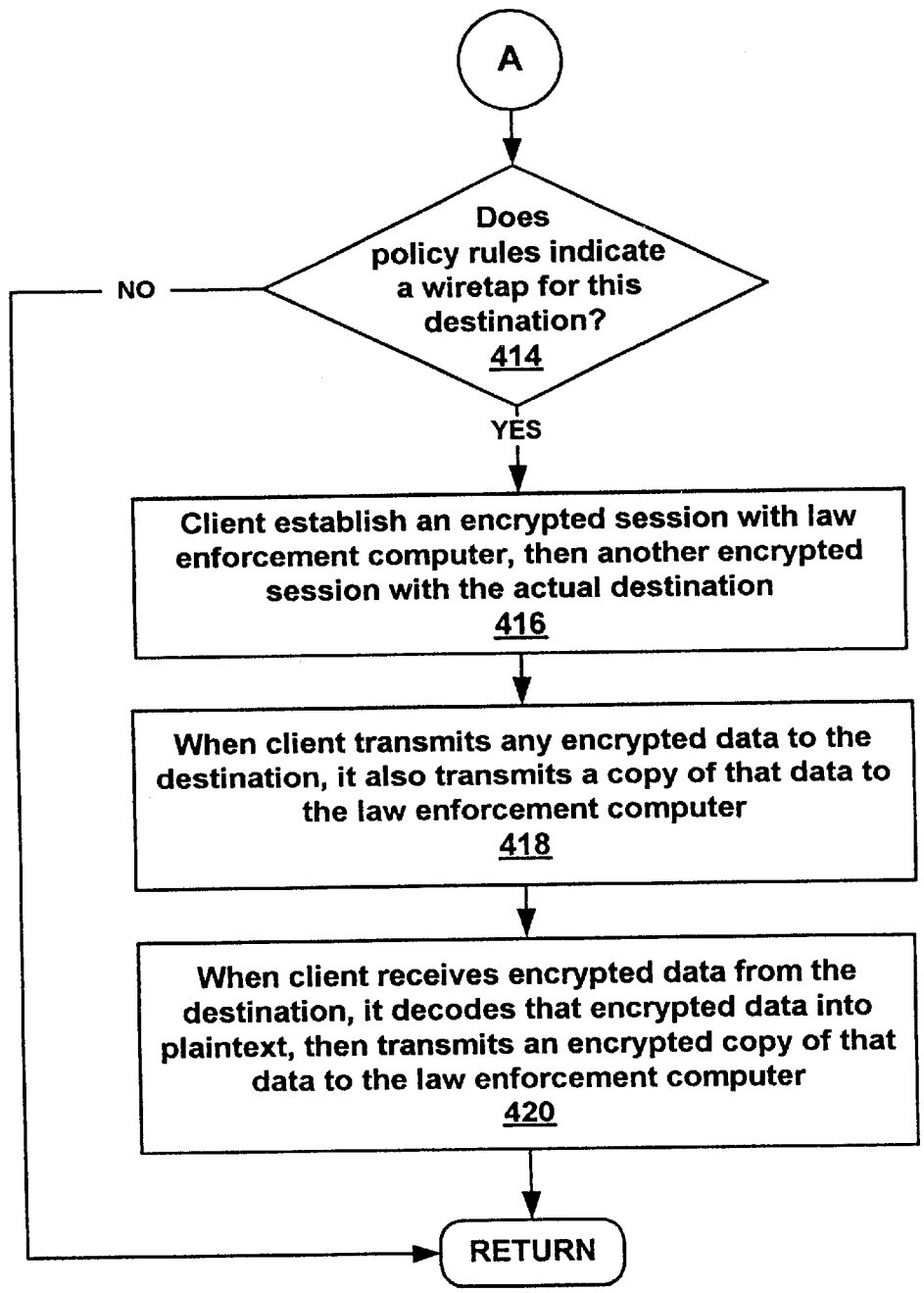
FIG. 4 (page 2 of 2)

SECURE WIRETAP SUPPORT FOR INTERNET PROTOCOL SECURITY

TECHNICAL FIELD

The field of the present invention pertains to communication. More particularly, the present invention relates to the field of encrypted network communication.

BACKGROUND ART

One of the many ways that people communicate is over networks made up of interconnected computer systems. With these computer system networks, large amounts of information can be sent and received over great distances in a very short period of time. There are different types of computer system networks. One type of network is referred to as a local area network (LAN) which is a private network that is typically used within smaller geographical areas, e.g., a building complex of a company. Another type of network is referred to as a wide area network (WAN) which is a network for many independent users that typically covers an expansive geographical area, e.g., a city, a country, or the world.

Obviously, these different types of computer networks can be associated with both legal and illegal activities. As such, the need sometimes arises for law enforcement agencies to monitor the activities of specific individuals or groups that utilize computer networks. Therefore, law enforcement agencies gain access to specific communications that travel over computer networks. One way this can be accomplished is by wiretapping a computer system used by a specific individual. But law enforcement agencies have encountered obstacles associated with wiretapping computer systems. One of the main obstacles is that some of the retrieved communication data is encrypted and therefore unreadable. As such, the encrypted communication data is rendered useless for the objectives of law enforcement agencies.

In an effort to combat this law enforcement obstacle of encrypted communication data, the United States (U.S.) government has restricted U.S. companies from exporting hardware and software which supports strong encryption. As such, U.S. companies are only allowed to export hardware and software that incorporate weak encryption algorithms. Security professionals understand that the weak encryption that is exported by U.S. companies offers no real security. Therefore, the U.S. government continues to prevent U.S. companies from competing in the global market for secure delivery systems.

Since about 1993, the U.S. government has indicated that if a "key escrow" system was developed and implemented, it would ease the restrictions on exportation of hardware and software that supports strong encryption. This key escrow system, also know as a "key recovery" or "key management infrastructure" (KMI) system, would be developed whereby encryption keys would be stored thereby enabling law enforcement agencies to access them if they have a court order. Such a key escrow system proposal is both practically and technically unworkable. For instance, the key escrow system would require a very massive database in order to store all the encryption keys ever used between two parties over any type of computer network. Another disadvantage associated with the key escrow system is that it would be an extremely appealing target for people who break into computer systems to perform illegal activities, commonly referred to as "hackers."

Recently, the U.S. government has indicated that besides the key escrow system, it would be satisfied with access to unencrypted communication data, also referred to as plaintext or cleartext, transmitted over computer networks. One prior art attempt for providing the U.S. government and law enforcement agencies access to plaintext involves utilizing the router as the encryption gateway while the end-station does not participate in the encryption of its traffic. Specifically, a router encrypts any data received from an end-station and then sends it to its destination. It should be appreciated that a series of routers are typically utilized during the transmission of data over a computer network. Therefore, in order to provide access to the plaintext, one of the routers in a series of routers decrypts the data and sends it in the clear to another router, which re-encrypts the data and sends it to its destination. As such, law enforcement agencies put a wiretap between the two routers in order to access the plaintext data while it is in the clear.

There are several disadvantages associated with the prior art router approach described above. One of the main disadvantages is that a computer user does not have any control over the encryption of their data. Instead, the computer user relinquishes that control to some third party. Consequently, this raises the issue of whether the third party is operating in the best interest of the computer user. Another disadvantage of the prior art router approach is that it allows plaintext communication data to be transmitted in the clear en route to its destination. As such, the possibility exists that others not associated with any law enforcement agency could also gain access to the plaintext communication data. Therefore, the prior art router approach is undesirable because it is not a completely secure information delivery system.

Another one of the disadvantages of the prior art router approach is a large performance drain on many routers caused by handling encryption for many different communication sessions. One prior art technique to overcome this performance drain is to add extra hardware to each router of the established infrastructure to specifically handle the encryption functionality. But there are also disadvantages associated with this prior art technique. For instance, it involves a monumental task of changing the established hardware infrastructure of routers that form computer networks. Furthermore, adding extra hardware to routers introduces extra costs to those who own routers.

Accordingly, a need exists for a method and system for providing law enforcement agencies the ability to wiretap specific encrypted communications. A further need exists for a method and system which meets the above need and which does not involve changing the established hardware infrastructure of computer networks. Still another need exists for a method and system which meets the above need and which does not slow down the performance of the network system. Furthermore, another need exists for a method and system which meets the above need and which does not relinquish encryption of communication data to a third party. Additionally, another need exists for a method and system which meets the above need and which does not allow communication data to be transmitted at any time in plaintext en route to its destination.

DISCLOSURE OF THE INVENTION

The present invention provides a method and system for providing law enforcement agencies the ability to wiretap specific encrypted communications. Moreover, the present invention provides a method and system which meets the above need and allows the established hardware infrastructure of computer networks to remain unchanged.

Furthermore, the present invention provides a method and system which meets the above need while not affecting the performance of the network. Additionally, the present invention provides a method and system which meets the above need while enabling end users to utilize any desired encryption algorithms for their communications. The present invention also provides a method and system which meets the above need while enabling encrypted communication data to remain encrypted during transmittal en route to its destination.

Specifically, one embodiment of the present invention includes a system for allowing controlled access to a networked communication. The system comprises an intermediate device that includes memory. The memory of the intermediate device is for storing a policy rule therein. The intermediate device is adapted to download the policy rules governing access to a desired location. The system further comprises a client which is coupled to the intermediate device. The client is adapted to receive the policy rule when the intermediate device downloads it to the client. As such, any communication data intended to travel between a first destination and the client is forwarded to a second destination.

Other embodiments of the present invention include the above and further comprise a remote access server, which forwards to the second destination any communication data intended to travel between the first destination and the client. Additionally, the second destination mentioned above is a destination that provides a law enforcement agency access to the communication data. Furthermore, the downloading of the policy rule by the intermediate device to the client mentioned above is motivated by a law enforcement agency desiring access to the communication data.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart of steps performed in accordance with one embodiment of the present invention to provide law enforcement agencies access to specific encrypted communication data within a LAN.

Figure 1:
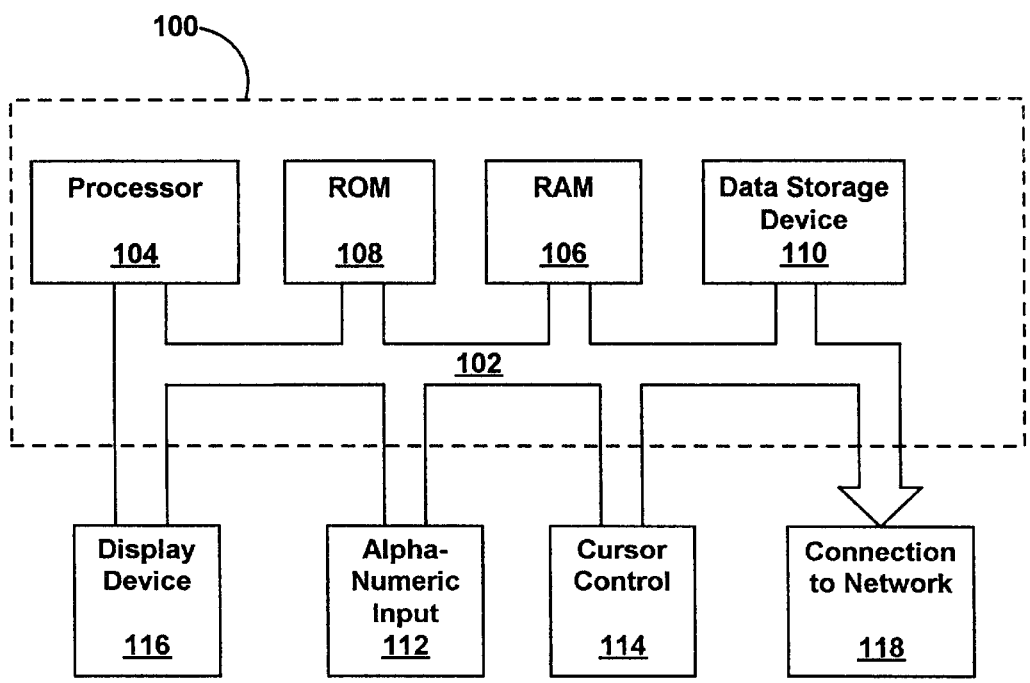
FIG. 1 is a schematic diagram of an exemplary computer system used to perform steps of the present method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing", "downloading", "prompting", "running" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Furthermore, as will be described below in detail, the components of computer system 100 reside, for example, in a client computer and/or in an intermediate device (e.g., policy server) of the present system and method. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80x86-family microprocessor or any other type of processor. System 100 also includes data storage features such as a computer usable volatile memory 106, e.g., random access memory (RAM), coupled to bus 102 for storing information and instructions for central processor unit 104, computer usable non-volatile memory 108, e.g., read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information. Additionally, computer system 100 of the present embodiment includes feature 118 for connecting computer system 100 to a network, e.g., a local area network (LAN) or a wide area network (WAN).

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

DETAILED DESCRIPTION OF THE STRUCTURE OF THE PRESENT INVENTION

Figure 2:
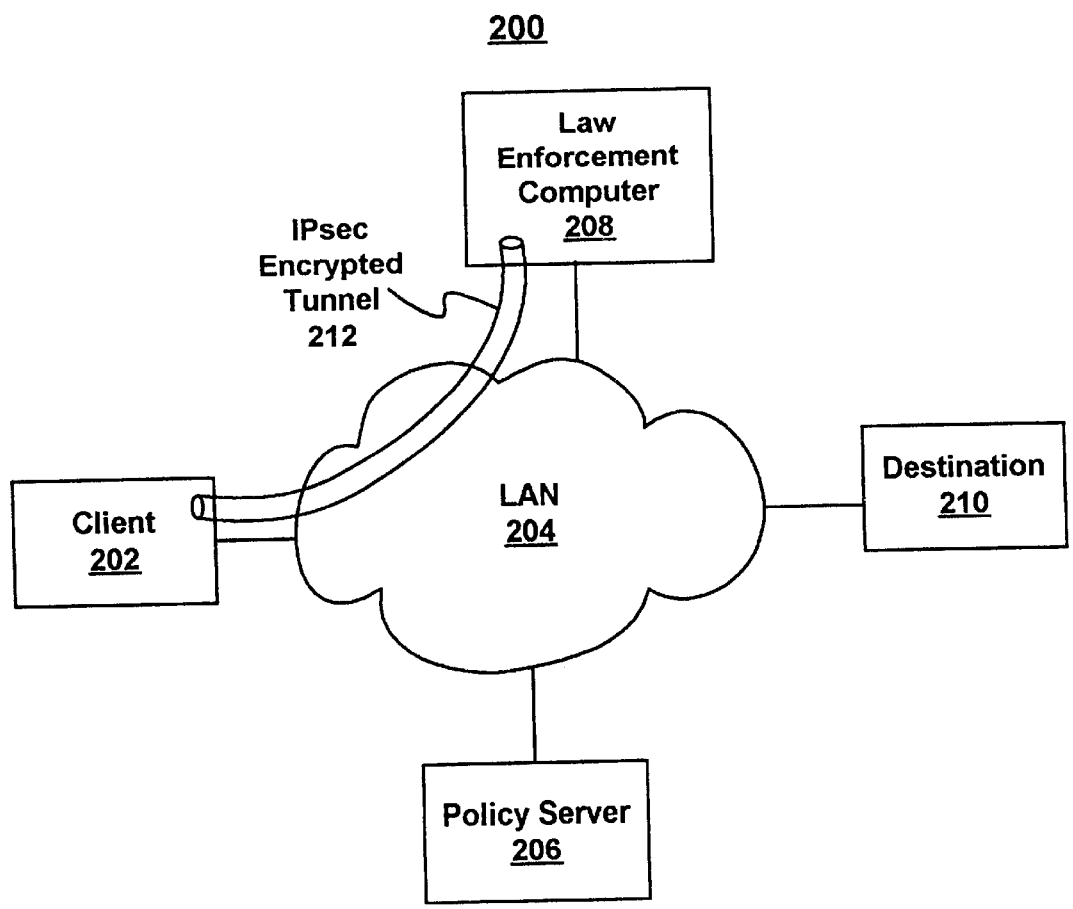
FIG. 2 is a schematic representation of a system for providing law enforcement agencies access to specific encrypted communication data within a local area network (LAN) in accordance with one embodiment of the present invention.

With reference now to FIG. 2, a system 200 for providing law enforcement agencies access to specific encrypted communication data within a local area network (LAN) in accordance with one embodiment of the present invention is shown. The present discussion will begin with a detailed description of the structure and physical components of the embodiments of the present invention. The discussion will then describe in detail the operation of the embodiments of the present invention. Referring to FIG. 2, the present embodiment includes a client 202 and a destination device 210 which are personal computers (PCs). However, although client 202 and destination device 210 are PCs in the present embodiment, the present invention is also well suited to an embodiment in which client 202 and destination 210 are comprised of devices other than PCs (e.g., workstations, personal digital assistants, and the like) which are capable of using Internet Protocol security networking protocol(s). Client 202 and destination 210 of the present embodiment may contain, for example, the features of computer system 100 described above in detail in conjunction with FIG. 1. Additionally, although only one client 202 and one destination 210 are shown for purposes of clarity, the present invention is also well suited to a system having a greater number of clients and destinations.

With reference still to FIG. 2, client 202 and destination 210 are coupled together via a local area network (LAN) 208. In so doing, client 202 and destination 210 are able to communicate with each other. Although a LAN 204 is shown in the present embodiment, the present invention is also well suited to be used within various other network configurations, e.g., wide area network (WAN).

The present embodiment of FIG. 2 also includes a policy server device 206 which is coupled to LAN 204. As a result, policy server 206 has the ability to communicate with client 202 and destination 210. It should be appreciated that in order for the present embodiment to operate properly, destination 210 does not have to be under the control of policy server 206. In the present embodiment, policy server 206 is a computer system server. However, the present invention is also well suited to embodiments of policy server 206 other than a server. Policy server 206 of the present embodiment may contain, for example, the features of computer system 100 described above in detail in conjunction with FIG. 1.

Still referring to FIG. 2, the present embodiment also includes a law enforcement agency computer 208 which is coupled to LAN 204. As a result, law enforcement computer 208 has the ability to communicate with either client 202 or policy server 206. It should be appreciated that in order for the present embodiment to operate properly, destination 210 does not have to communicate with law enforcement computer 208. In the present embodiment, law enforcement computer 208 is a laptop PC. However, although law enforcement computer 206 is a laptop PC within the present embodiment, the present invention is also well suited to an embodiment in which law enforcement computer 206 is comprised of a device other than a laptop PC (e.g., desktop PC, server, mainframe, and the like). Although system 200 is shown in FIG. 2, it should be appreciated that the present invention is also well suited for operating in a system which is configured differently than system 200.

Figure 3:
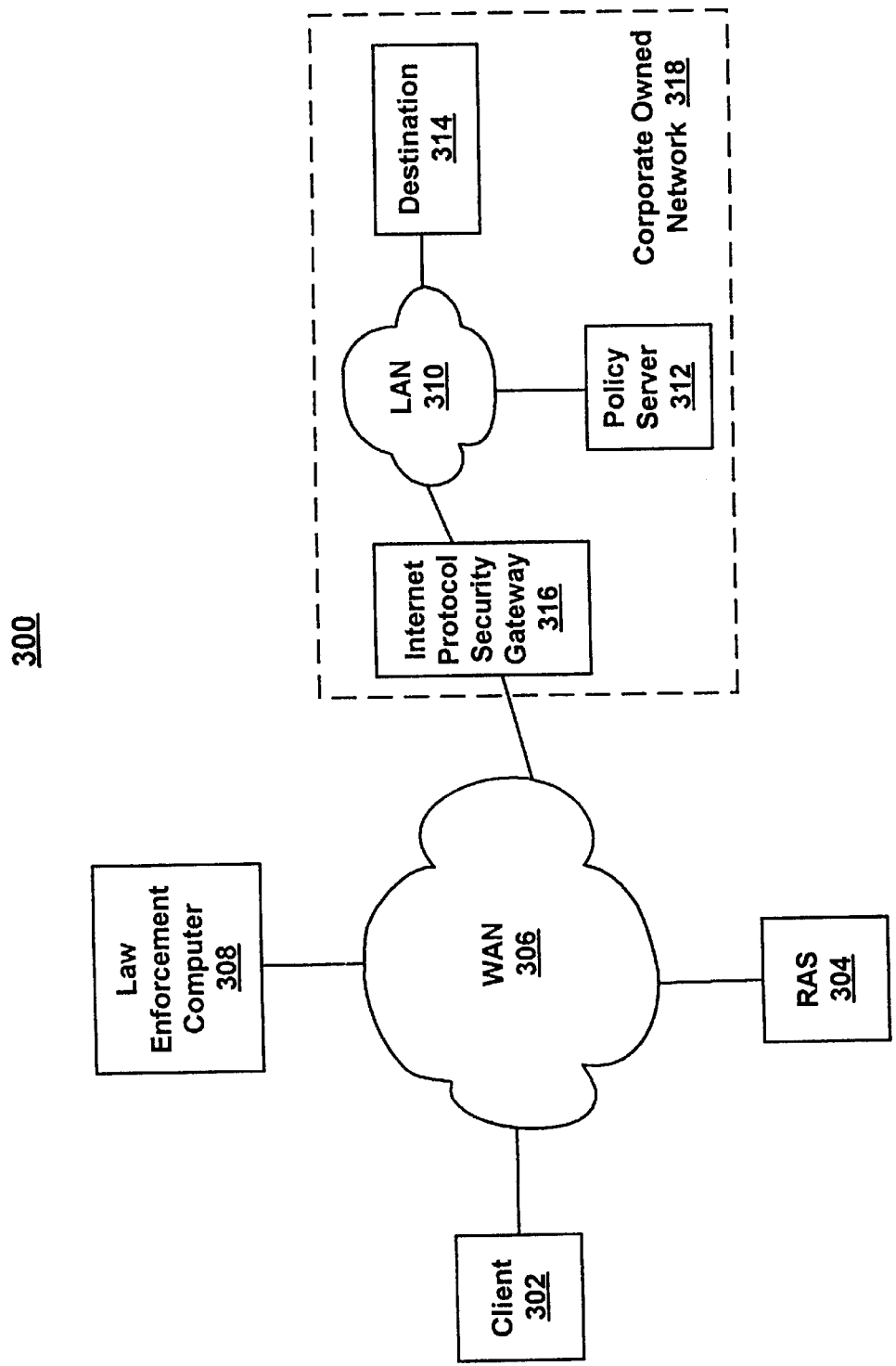
FIG. 3 is a schematic representation of a system for providing law enforcement agencies access to specific encrypted communication data within a wide area network (WAN) in accordance with one embodiment of the present invention.

Referring now to FIG. 3, a system 300 for providing law enforcement agencies access to specific encrypted communication data within a wide area network (WAN) in accordance with one embodiment of the present invention is shown. The present embodiment includes a client 302, a law enforcement computer 308, and a destination device 314. It should be appreciated that within the present embodiment, destination 314 does not need not be coupled to LAN 310. Instead, destination 314 could be coupled to WAN 306.

Additionally, within the present embodiment, client 302, law enforcement computer 308, and destination device 314 are PCs. However, although client 302, law enforcement computer 308, and destination device 314 are PCs in the present embodiment, the present invention is also well suited to an embodiment in which client 302, law enforcement computer 308, and destination device 314 are comprised of devices other than PCs (e.g., workstations, personal digital assistants, and the like) which are capable of using Internet Protocol security networking protocol(s). Client 302, law enforcement computer 308, and destination device 314 of the present embodiment may contain, for example, the features of computer system 100 described above in conjunction with FIG. 1. Furthermore, although only one client 302 and one destination 314 are shown for purposes of clarity, the present invention is also well suited to a system having a greater number of clients and destinations.

With reference to FIG. 3, the present embodiment also includes a remote access server (RAS) 304 and a policy server 312. In the present embodiment, RAS 304 and policy server 312 are computer system servers. However, the present invention is also well suited to an embodiment in which RAS 304 and policy server 312 are comprised of devices other than computer system servers (e.g., personal computers). Policy server 312 and RAS 304 of the present embodiment may contain, for example, the features of computer system 100 described above in conjunction with FIG. 1.

Referring still to FIG. 3, client 302, law enforcement computer 308, and RAS 304 are coupled together via a wide area network (WAN) 306. In so doing, client 302, law enforcement computer 308, and RAS 304 are able to communicate with each other. Although WAN 306 is shown in the present embodiment, the present invention is also well suited to use with various other network configurations, e.g., a metropolitan area network (MAN). Additionally, as shown in FIG. 3, a corporate Internet Protocol security gateway 316, destination 314, and policy server 312 are coupled together via a local area network (LAN) 310 within a corporate owned network 318. It should be appreciated that in order for the present embodiment to operate properly, destination 314 does not have to be under the control of policy server 312.

Within FIG. 3, LAN 310 is coupled to WAN 306 via Internet Protocol security gateway 316. As such, client 302, RAS 304, law enforcement computer 308, policy server 312, and destination 314 have the ability to communicate with each other. Although system 300 is shown in FIG. 3, it should be appreciated that the present invention is also well suited for operating in a system which is configured differently than system 300.

DETAILED DESCRIPTION OF THE OPERATION OF THE PRESENT INVENTION

With reference to FIG. 4, a flowchart 400 of steps performed in accordance with one embodiment of the present invention to provide law enforcement agencies access to specific encrypted communication data within a LAN is shown. Flowchart 400 includes processes of the present invention which, in one embodiment, are carried out by a processor or processors under the control of computer readable and computer executable instructions. The computer readable and computer executable instructions reside, for example, in data storage features such a computer usable volatile memory 106 and/or computer usable non-volatile memory 108 of FIG. 1. The computer readable and computer executable instructions are used to control or operate in conjunction with, for example, central processing unit 104 of FIG. 1. It should be appreciated that the computer readable and computer executable instructions of the present embodiment exist below the network layer, the lowest layer of the Internet Protocol stack. In this manner, the presence and operation of the present invention is transparent to other applications. As mentioned above, the features of computer system 100 of FIG. 1 are well suited to be disposed, for example, in client 202, destination 210, policy server 206, and law enforcement computer 208. Although specific steps are disclosed in flowchart 400 of FIG. 4, such steps are exemplary. That is, the present invention is well suited to performing various other steps or variations of the steps recited in FIG. 4.

In step 402 of FIG. 4, in one embodiment of the present invention, policy rules are stored in memory of policy server 206 of FIG. 2, which is coupled to LAN 204 of FIG. 2. It should be appreciated that within the present embodiment, the policy rules stored within policy server 206 are intended for specific clients coupled to LAN 204 which are being investigated by a law enforcement agency possessing a valid court order. As such, the policy rules of the present embodiment are the means to eventually enable the law enforcement agency to have access to encrypted communication data transmitted and received by specific clients (e.g., client 202 of FIG. 2).

Referring now to step 404, within the present embodiment, client 202 establishes a communication link to policy server 206 via LAN 204. In so doing, client 202 and policy server 206 are able to communicate with each other.

At step 406, the present embodiment determines whether client 202 has its most current policy rules installed thereon. If client 202 already has its most current policy rules installed thereon, the present embodiment proceeds to step 412. If client 202 does not have its most current policy rules installed thereon, the present embodiment proceeds to step 408.

In step 408 of FIG. 4, the present embodiment downloads the most current policy rules for client 202 from policy server 206 to client 202 via LAN 204 of FIG. 2.

Referring now to step 410, within the present embodiment client 202 receives its most current policy rules and stores them within its memory. It should be appreciated that the downloading and storage of the most current policy rules is transparent to the user of client 202. In this manner, the user being investigated by the law enforcement agency is unaware that his communication will be subsequently monitored.

At step 412, the present embodiment determines whether client 202 has begun transmitting to a destination (e.g., destination 210 of FIG. 2). If client 202 has not begun transmitting to a destination, the present embodiment proceeds to the beginning of step 412. If client 202 has begun transmitting to a destination (e.g., destination 210), the present embodiment proceeds to step 414.

In step 414, the present embodiment determines whether the current policy rules stored within client 202 indicate a wiretap of the specific destination (e.g., destination 210 of FIG. 2). If the current policy rules do not indicate a wiretap of the specific destination, the present embodiment proceeds to the end of flowchart 400. If the current policy rules indicate a wiretap of the specific destination (e.g., destination 210) the present embodiment proceeds to step 416. In the present embodiment, the current policy rules stored within client 202 can include a variety of communication situations that need to be satisfied before the present embodiment proceeds to step 416. For example, the policy rules could include the specific type of application (e.g., browser program) used during a communication session. Moreover, the policy rules could also include the specific destination and specific application (e.g., electronic mail program) used during a communication session. Furthermore, the policy rules could include any type of communication session initiated by client 202. In this manner, the investigating law enforcement agency can access specific communication data transmitted and received by client 202. It is further appreciated that the policy rules of the present embodiment have a defined lifetime, after which the policy rules need to be refreshed from policy server 206. Mechanisms that allow policy rules to be downloaded to active clients at any time are well known by those of ordinary skill in the art.

With reference to step 416 of FIG. 4, within the present embodiment, client 202 establishes an encrypted communication session (e.g., Internet Protocol security encrypted tunnel 212) with law enforcement computer 208 via LAN 204. It should be appreciated that establishing an Internet Protocol security encrypted tunnel 212 is well known by those of ordinary skill in the art. Furthermore, at step 416 within the present embodiment, client 202 proceeds to establish an encrypted communication session with the actual destination (e.g., destination 210) via LAN 204. It should be appreciated that within the present embodiment, the encryption keys received by the law enforcement computer 208 are different than the encryption keys received by the actual destination (e.g., destination 210). Within the present embodiment, a law enforcement agency has access to or control over law enforcement computer 208. It should be further appreciated that law enforcement computer 208 does not need to be directly coupled to LAN 204 as shown in FIG. 2. For example, law enforcement computer 208 could be coupled to a wide area network (WAN) which is coupled to LAN 204. As such, an encrypted communication session could be established between client 202 and law enforcement computer 208 via LAN 204 and the WAN.

Now referring to step 418, whenever client 202 transmits any packets containing encrypted data to destination 210 during the encrypted communication session of the present embodiment, client 202 also transmits an exact copy of the original plaintext data packets to law enforcement computer 208 via encrypted tunnel 212. As such, law enforcement computer 208 and destination 210 both receive the same plaintext data packets. It is appreciated that law enforcement computer 208 of the present embodiment may decode the encrypted communication data of the communication session into plaintext, since it negotiated the session key(s) for encrypted tunnel 212 in advance with client 202. It should be further appreciated that the session key(s) received by law enforcement computer 208 are different from the session key(s) received by destination 210.

In step 420 of FIG. 4, whenever client 202 receives any packets containing encrypted data from destination 210 during the communication session of the present embodiment, client 202 decodes them into plaintext, then transmits an encrypted copy of that data to law enforcement computer 208 via encrypted tunnel 212. In this manner, law enforcement computer 208 receives any data packets received by client 202 during its communication session with destination 210.

Figure 5A:
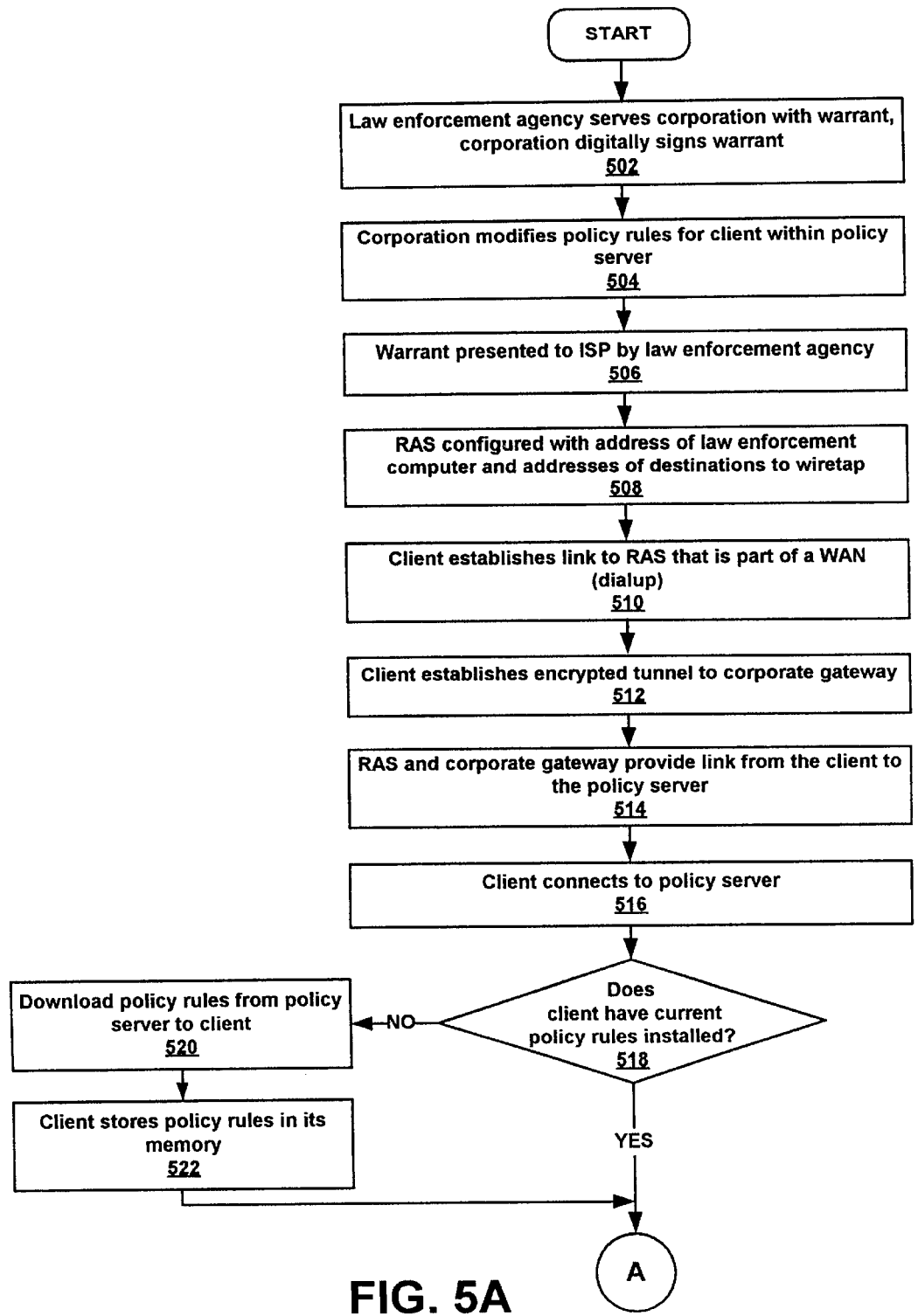
FIGS. 5A and 5B are a flowchart of steps performed in accordance with one embodiment of the present invention to provide law enforcement agencies access to specific encrypted communication data within a WAN.
Figure 5B:
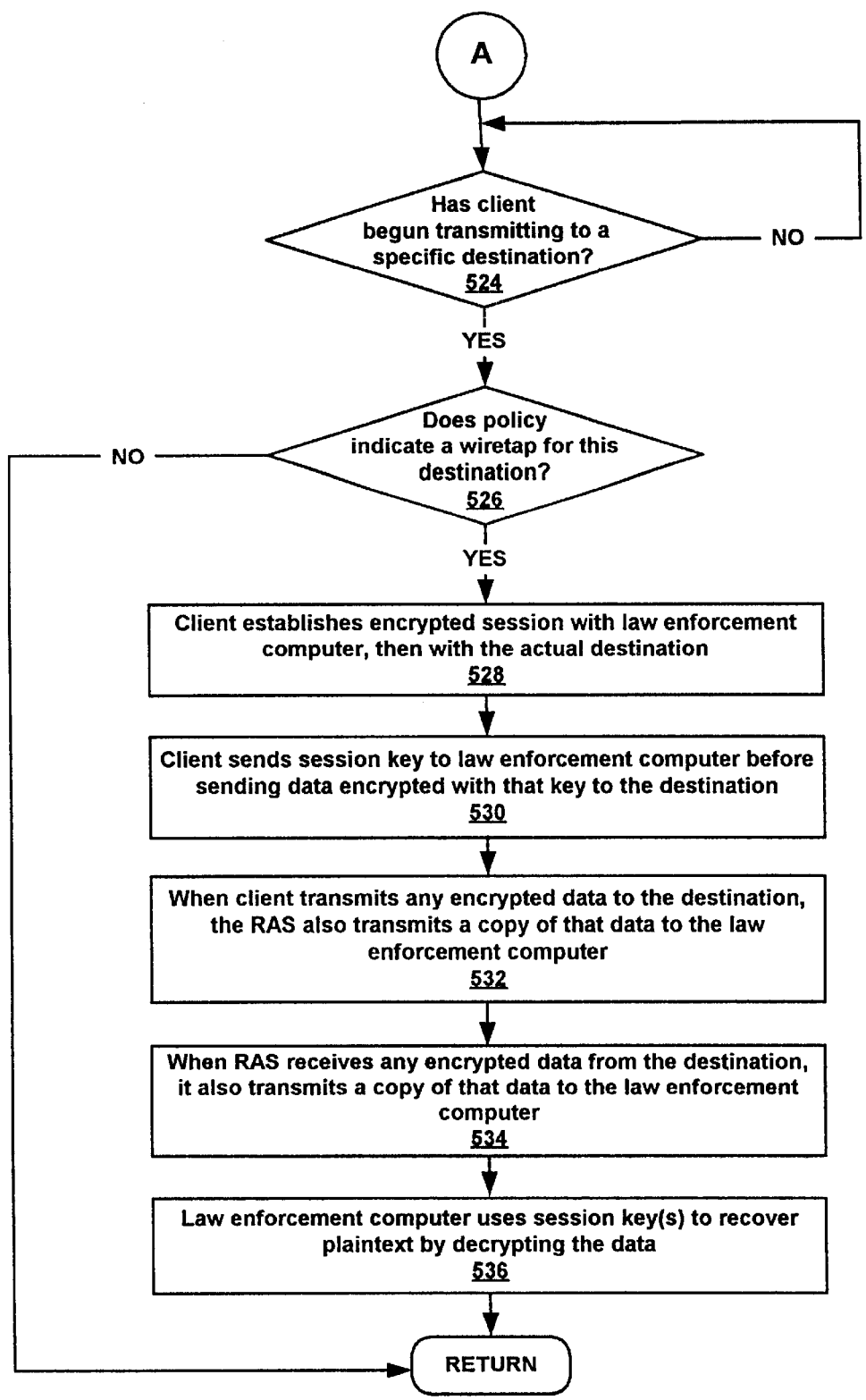

With reference to FIGS. 5A and 5B, a flowchart 500 of steps performed in accordance with one embodiment of the present invention to provide law enforcement agencies access to specific encrypted communication data within a WAN is shown. Flowchart 500 includes processes of the present invention which, in one embodiment, are carried out by a processor or processors under the control of computer readable and computer executable instructions. The computer readable and computer executable instructions reside, for example, in data storage features such a computer usable volatile memory 106 and/or computer usable non-volatile memory 108 of FIG. 1. Furthermore, the computer readable and computer executable instructions are used to control or operate in conjunction with, for example, central processing unit 104 of FIG. 1. Moreover, the computer readable and computer executable instructions of the present embodiment exist below the network layer, the lowest layer of the Internet Protocol stack. In this manner, the presence and operation of the present invention is transparent to other applications. Although specific steps are disclosed in flowchart 500 of FIGS. 5A and 5B, such steps are exemplary. That is, the present invention is well suited to performing various other steps or variations of the steps recited in FIGS. 5A and 5B.

In step 502 of FIG. 5A, in one embodiment of the present invention, a law enforcement agency serves a corporation with a valid warrant authorized by a court of law. The warrant within the present embodiment authorizes the law enforcement agency to monitor computer communications of a person under investigation within the corporation that uses client 302 of FIG. 3. Furthermore, at step 502 of the present embodiment, the corporation digitally signs the valid warrant.

Referring now to step 504, within the present embodiment, the corporation modifies the policy rules for client 302 which are stored within policy server 312 in response to receiving the warrant from the law enforcement agency. It should be appreciated that the policy rules of the present embodiment are the means to eventually enable the law enforcement agency to have access to encrypted communication data transmitted and received by the user of client 302.

At step 506 of FIG. 5A, within the present embodiment, the law enforcement agency presents the digitally signed warrant to an internet service provider (ISP) that is utilized by the user of client 302. In this manner, the ISP is made aware that the corporation has been notified of the warrant which enables the law enforcement agency to access communication data transmitted and received by the user of client 302.

Referring to step 508, within the present embodiment, remote access server (RAS) 304 of the ISP is configured with the address of law enforcement computer 308 and the addresses of destinations that the law enforcement agency desires to wiretap. Within the present embodiment, it should be appreciated that RAS 304 can be configured in such a way that all of the destinations that client 302 communicates with can be wiretapped.

In step 510 of FIG. 5A, within the present embodiment, client 302 establishes a communication link to RAS 304 via WAN 204 (e.g., dial-up). In so doing, client 302 and RAS 304 are able to communicate with each other. Within the present embodiment, RAS 304 is part of the ISP.

Referring now to step 512, within the present embodiment, client 302 establishes an encrypted tunnel to a corporate Internet Protocol security gateway 316 of the corporate owned network 318. It should be appreciated that establishing an encrypted tunnel is well known by those of ordinary skill in the art.

At step 514, within the present embodiment, RAS 304 and corporate Internet Protocol security gateway 316 provide a communication link between client 302 and policy server 312 via WAN 306 and LAN 310. As such, client 302 and policy server 312 are able to communicate with each other.

In step 516 of FIG. 5A, within the present embodiment, client 302 connects to policy server 312 via LAN 310 of the corporate owned network 318. As such, client 302 and policy server 312 are able to communicate within each other.

Referring now to step 518, the present embodiment determines whether client 302 has its most current policy rules installed thereon. If client 302 already has its most current policy rules installed thereon, the present embodiment proceeds to step 524 of FIG. 5B. If client 302 does not have its most current policy rules installed thereon, the present embodiment proceeds to step 520.

At step 520 of FIG. 5A, the present embodiment downloads the most current policy rules for client 302 from policy server 312 to client 302 via LAN 310, Internet Protocol security gateway 316, and WAN 306 of FIG. 3.

With reference to step 522, the present embodiment client 302 receives its most current policy rules and stores them within its memory. It should be appreciated that the downloading and storage of the most current policy rules is transparent to the user of client 302. In this manner, the user being investigated by the law enforcement agency is unaware that his communication will be subsequently monitored.

At step 524 of FIG. 5B, the present embodiment determines whether client 302 has begun transmitting to a destination (e.g., destination 314 of FIG. 3). If client 302 has not begun transmitting to a destination, the present embodiment proceeds to the beginning of step 524. If client 302 has begun transmitting to a destination (e.g., destination 314), the present embodiment proceeds to step 526.

In step 526, the present embodiment determines whether the current policy rules stored within client 302 indicate a wiretap of the specific destination (e.g., destination 314 of FIG. 3). If the current policy rules do not indicate a wiretap of the specific destination, the present embodiment proceeds to the end of flowchart 500. If the current policy rules indicate a wiretap of the specific destination (e.g., destination 314), the present embodiment proceeds to step 528. In the present embodiment, the current policy rules stored within client 302 can include a variety of communication situations that need to be satisfied before the present embodiment proceeds to step 528. For example, the policy rules could include the specific type of application (e.g., browser program) used during a communication session. Moreover, the policy rules could also include the specific destination and specific application (e.g., electronic mail program) used during a communication session. Furthermore, the policy rules could include any type of communication session initiated by client 302. In this manner, the investigating law enforcement agency can access specific communication data transmitted and received by client 302. It is further appreciated that the policy rules of the present embodiment have a defined lifetime, after which the policy rules need to be refreshed from policy server 312. Mechanisms that allow policy rules to be downloaded to active clients at any time are well known by those of ordinary skill in the art.

With reference to step 528 of FIG. 5B, within the present embodiment, client 302 establishes an encrypted communication session (e.g., Internet Protocol security encrypted tunnel) with law enforcement computer 308 via RAS 304 and WAN 306. It should be appreciated that establishing an Internet Protocol security encrypted tunnel is well known by those of ordinary skill in the art. Furthermore, at step 528 within the present embodiment, client 302 proceeds to establish an encrypted communication session with the actual destination (e.g., destination 314) via RAS 304, Internet Protocol security gateway 316, and LAN 310. Within the present embodiment, a law enforcement agency has access to or control over law enforcement computer 308. It should be further appreciated that law enforcement computer 308 does not need to be directly coupled to WAN 306 as shown in FIG. 3. For example, law enforcement computer 306 could be coupled to LAN 310. As such, a encrypted communication session could be established between client 302 and law enforcement computer 308 via RAS 304, WAN 306, Internet Protocol security gateway 316, and LAN 310.

At step 530, within the present embodiment, client 302 sends a session encryption key to law enforcement computer 308 before sending data encrypted with that session key to the actual destination (e.g., destination 314). It should be appreciated that within the present embodiment, law enforcement computer 308 and destination 314 receive the same session encryption keys for a communication session.

Now referring to step 532, whenever client 302 transmits any packets containing encrypted data to destination 314 during the encrypted communication session of the present embodiment, RAS 304 transmits an exact copy of the encrypted data packets to law enforcement computer 308. Within the present embodiment, it is desirable that RAS 304 transmit a copy of the encrypted data packets to law enforcement computer 308 instead of client 302 transmitting it. The reason is that if the established communication link between client 302 and RAS 304 is initially slow (e.g., over a telephone line), its effective speed will become even slower if client 302 also has to transmit a second copy of the encrypted data to law enforcement computer 308. As a result, the user of client 302 may become suspicious of the decrease in transmission performance of client 302 and may eventually become aware of the law enforcement agency monitoring his communications.

In step 534 of FIG. 5B, whenever RAS 304 receives any packets containing encrypted data from destination 314 that are intended for client 302 during the communication session of the present embodiment, RAS 304 transmits an exact copy of the encrypted data packets to law enforcement computer 308. In this manner, law enforcement computer 308 receives any data packets received by client 302 during its communication session with destination 314.

With reference to step 536, within the present embodiment, law enforcement computer 308 uses the received session key(s) to decode the encrypted communication data of the communication session into plaintext. As such, the law enforcement agency has access to the plaintext of the encrypted communication session between client 302 and destination 314.

As mentioned above, the present invention is well suited to performing various other steps or variations of the steps recited in flowchart 500 of FIGS. 5A and 5B. For instance, flowchart 500 could be modified in order to be utilized within a local area network (LAN) configuration as shown in FIG. 2. Specifically, client 202 securely passes encryption key(s) to law enforcement computer 208. As encrypted data packets are transmitted between client 202 and destination 210, an edge switch within LAN 204, instead of RAS 304 of FIG. 3, could be used to transmit copies of the encrypted data packets to law enforcement computer 208. Therefore, law enforcement computer 208 receives the desired encrypted data and encryption keys used to decode it into plaintext.

Thus, the present invention provides a method and system for providing law enforcement agencies the ability to wiretap specific encrypted communications. Moreover, the present invention provides a method and system which meets the above need and allows the established hardware infrastructure of computer networks to remain unchanged. Furthermore, the present invention provides a method and system which meets the above need while not affecting the performance of the network. Additionally, the present invention provides a method and system which meets the above need while enabling end users to utilize any desired encryption algorithms for their communications. The present invention also provides a method and system which meets the above need while enabling encrypted communication data to remain encrypted during transmittal en route to its destination. Moreover, the present invention also provides wiretaps that are not obvious to either party that is under investigation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for allowing controlled access to encrypted networked communication, said system comprising:
   an intermediate device, said intermediate device including memory for storing a policy rule therein, said intermediate device adapted to download said policy rule to a desired location; and
   a client coupled to said intermediate device, said client adapted to receive said policy rule when said intermediate device downloads said policy rule to said client, said policy rule causes said client to establish a first encrypted communication session with a first destination device for a monitoring purpose and a second encrypted communication session with a second destination device; and
   when said client transmits encrypted communication data to said second destination device via said second encrypted communication session, said policy rule causes said client to transmit a copy of said encrypted communication data to said first destination device via said first encrypted communication session.

2. The system as described in claim 1 wherein said intermediate device is a computer system.

3. The system as described in claim 1 wherein said intermediate device is a policy server.

4. The system as described in claim 1 wherein said policy rule causes said client to forward to said first destination device any encrypted communication data said client receives from said second destination device via said second encrypted communication session.

5. The system as described in claim 1 wherein said first destination device is a destination device that provides a law enforcement agency access to said encrypted communication data.

6. The system as described in claim 1 wherein said downloading of said policy rule by said intermediate device to said client is motivated by a law enforcement agency desiring access to said encrypted communication data.

7. The system as described in claim 1 wherein said first encrypted communication session and said second encrypted communication session utilize different encryption keys.

8. The system as described in claim 1 wherein said first encrypted communication session and said second encrypted communication session utilize the same encryption key.

9. The system as described in claim 1 wherein said client comprises a computer.

10. The system as described in claim 1 wherein said first destination device and said second destination device each comprise a computer.

11. The system as described in claim 1 wherein said first encrypted communication session comprises an Internet Protocol security encrypted tunnel.

12. A system for allowing controlled access to encrypted networked communication, said system comprising:
    an intermediate device having memory adapted for storing a policy rule therein, said intermediate device adapted to download said policy rule to a desired location, said intermediate device adapted to configure a client such that any encrypted communication data intended to travel between a first destination device and said client is also forwarded by said client to a second destination device for monitoring.

13. The system as described in claim 12 wherein said intermediate device is a computer system.

14. The system as described in claim 12 wherein said intermediate device is a policy server.

15. The system as described in claim 12 wherein said policy rule causes said client to forward to said second destination device any encrypted communication data intended to travel between said first destination device and said client.

16. The system as described in claim 12 wherein said second destination device is a destination device that provides a law enforcement agency access to said encrypted communication data.

17. The system as described in claim 12 wherein said client comprises a computer.

18. The system as described in claim 12 wherein said encrypted communication data is an encryption key.

19. A method for allowing controlled access to encrypted network communication, said method comprising:
    (a) storing a policy rule in memory of an intermediate device; and
    (b) downloading said policy rule to a client device;
    (c) said policy rule causing said client device to establish a first encrypted communication session with a first destination device for a monitoring purpose;
    (d) said policy rule causing said client device to establish a second encrypted communication session with a second destination device; and
    (e) in response to said client device transmitting encrypted communication data to said second destination device via said second encrypted communication session, said policy rule causing said client device to transmit a copy of said encrypted communication data to said first destination device via said first encrypted communication session.

20. The method as described in claim 19 wherein (a) comprises storing said policy rule in memory of a computer system.

21. The method as described in claim 19 wherein (a) comprises storing said policy rule in memory of a policy server.

22. The method as described in claim 19 wherein said policy rule further causing said client device to forward to said first destination device any encrypted communication data intended to travel between said second destination device and said client device.

23. The method as described in claim 19 wherein said first destination device provides a law enforcement agency access to said encrypted communication data.

24. The method as described in claim 19 wherein step (b) comprises downloading said policy rule because of motivation by a law enforcement agency desiring access to said encrypted communication data.

25. The method as described in claim 19 wherein said first encrypted communication session and said second encrypted communication session utilize different encryption keys.

26. The method as described in claim 19 wherein said first encrypted communication session and said second encrypted communication session utilize the same encryption key.

27. The method as described in claim 19 wherein said client device comprises a computer.

28. The method as described in claim 19 wherein said first destination device and said second destination device each comprise a computer.

29. The method as described in claim 19 wherein said first encrypted communication session comprises an Internet Protocol security encrypted tunnel.

30. In a computer system having a processor coupled to a bus, a computer readable medium coupled to said bus and having stored therein a computer program that when executed by said processor causes said computer system to implement a method for allowing controlled access to encrypted network communication, said method comprising the steps of:
   a) storing a policy rule in memory of an intermediate device; and
   b) downloading said policy rule to a client such that any encrypted communication data intended to travel between a first destination device and said client is also forwarded to a second destination device by said client.

31. The computer readable medium as described in claim 30 wherein said intermediate device comprises a computer system.

32. The computer readable medium as described in claim 30 wherein said intermediate device comprises a policy server.

33. The computer readable medium as described in claim 30 wherein said policy rule causes said client to forward to said second destination any communication data intended to travel between said first destination and said client.

34. The computer readable medium as described in claim 30 wherein said policy rule causes said client to forward to said second destination any encrypted communication data that travels between said first destination device and said client.

35. The computer readable medium as described in claim 30 wherein said second destination device provides a law enforcement agency access to said encrypted communication data.

36. The computer readable medium as described in claim 30 wherein (b) is motivated by a law enforcement agency desiring access to said encrypted communication data.

37. The computer readable medium as described in claim 30 wherein said first destination device comprises a computer.

38. The computer readable medium as described in claim 30 wherein said second destination device comprises a computer.

39. The computer readable medium as described in claim 30 wherein said encrypted communication data comprises an encryption key.

40. The computer readable medium as described in claim 30 wherein said first destination device and said second destination device each comprise a computer.

* * * * *